Sept. 9, 1924.

I. T. BENNETT

CAN OPENER

Filed Aug. 23, 1922

1,507,572

INVENTOR
I. T. BENNETT
BY *E. E. Huffman*
ATTORNEY

Patented Sept. 9, 1924.

1,507,572

UNITED STATES PATENT OFFICE.

INSLEE T. BENNETT, OF EDWARDSVILLE, ILLINOIS.

CAN OPENER.

Application filed August 23, 1922. Serial No. 583,761.

*To all whom it may concern:*

Be it known that I, INSLEE T. BENNETT, a citizen of the United States of America, residing at the city of Edwardsville, State of Illinois, United States of America, have invented a certain new and useful Can Opener, of which the following is such a full, clear, and exact description as will enable any one skilled in the art to which it appertains to make and use the same, reference being had to the accompanying drawings, forming part of this specification.

My invention relates to a can opener and has for its object the production of a device which will be simple in construction, inexpensive to manufacture and at the same time efficient in operation and durable.

Figure 1:
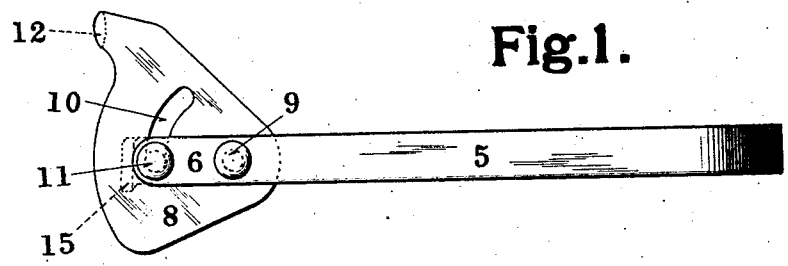
Figure 2:
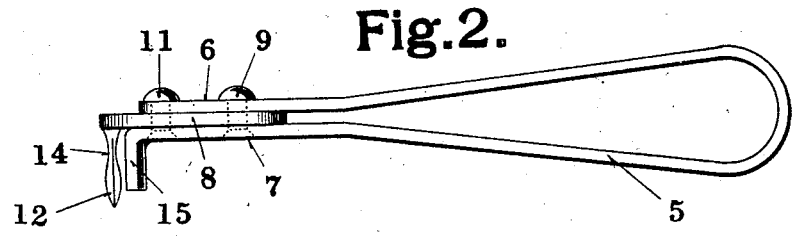
Figure 3:
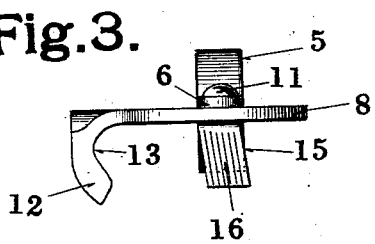
Figure 4:
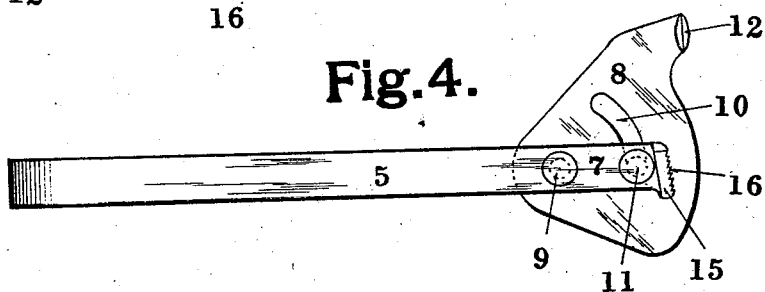

In the accompanying drawings which illustrate one form of opener made in accordance with my invention, Figure 1 is a top plan view, Figure 2 is a side elevation, Figure 3 is an end view and Figure 4 is a bottom plan view.

The handle of the device consists of a loop 5 of strap metal terminating in parallel top and bottom ends 6 and 7, respectively. 8 is a plate pivoted between the ends by means of a rivet 9 or other suitable fastening means. The plate 8 is provided with a curved slot 10 concentric with the pivot 9. A rivet 11 connects the ends 6 and 7 at a point beyond the pivot 9 and passes through the slot 10. The rivet 11 thus serves not only to hold the ends snugly against the plate, but also acts as a stop to limit the movement of the plate by contact with the ends of the slot.

Formed integral with the plate 8 is a blade 12. This blade 12 has a reentrant front edge 13, as best shown in Figure 3. The blade is also reduced laterally at a point 14 intermediate of its length as shown in Figure 2. In order to actuate the blade 12, I provide the bottom end 7 of the handle with a down turned portion 15 having a serrated face 16 and forming an actuating dog. This dog 15 is inclined slightly toward the rear, as best shown in Figure 3 to overcome any tendency to force the end 7 against the top of the can with undue force during the operation of the device.

In using my device, the blade 12 is forced through the top of the can adjacent to the edge and then drawn around the top adjacent to the edge by the action of the actuating dog on the periphery of the can. The action of the dog on the periphery of the can when the handle 3 is swung on its pivot 9 not only draws the blade 12 around the can but at the same time tends to force the blade outwardly toward the rim or edge of the can. This action, together with the form of the blade, causes the cut edge to be turned downwardly, thus eliminating exposed sharp edges.

Having fully described my invention what I claim as new and desire to secure by Letters Patent of the United States is:

In a device of the class described, the combination with a loop forming a handle, one end of said loop being turned down and having a serrated face forming a dog, of a plate pivoted between the arms of said loop and provided with an integral blade and also a slot formed therein between the pivot point and the blade, and a rivet in said handle engaging with said slot to form a stop.

In testimony whereof, I have hereunto set my hand and affixed my seal.

INSLEE T. BENNETT. [L. S.]